N. W. McLEOD.
ART OF MAKING CORD TIRES.
APPLICATION FILED DEC. 18, 1914.
1,250,917.
Patented Dec. 18, 1917.
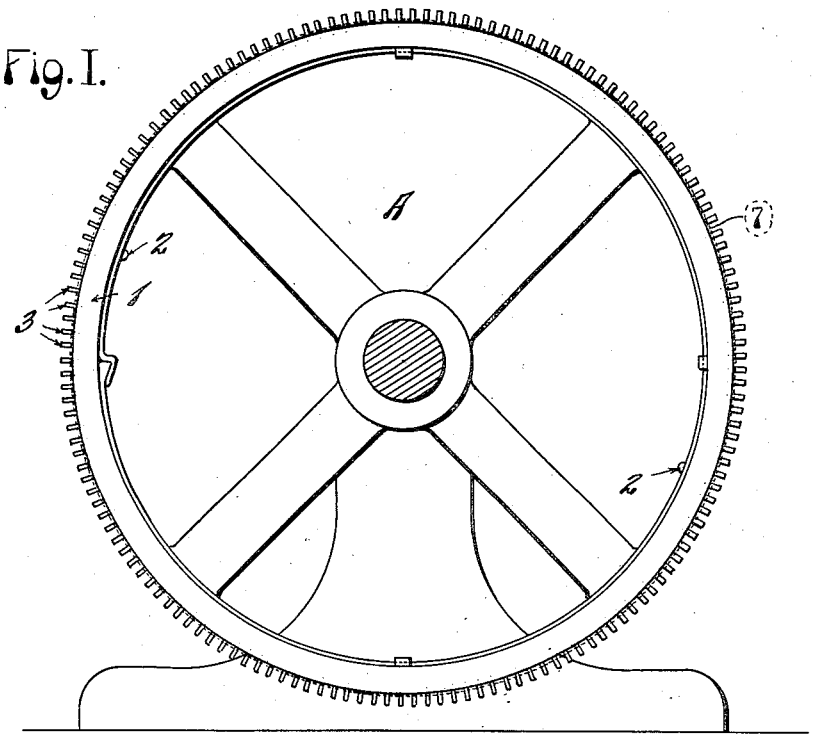
Fig. I.
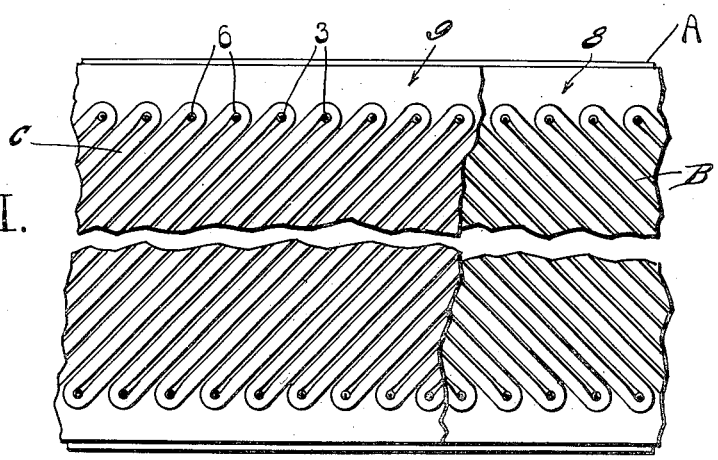
Fig. II.
Fig. III. 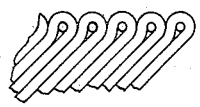
Attest
a.j. McCauley
E. K. Clark
Fig. IV. 
Inventor:
N. W. McLeod
by Knight & Cook
Att'ys N. W. McLEOD.
ART OF MAKING CORD TIRES.
APPLICATION FILED DEC. 18, 1914.
1,250,917.
Patented Dec. 18, 1917.
3 SHEETS—SHEET 2.
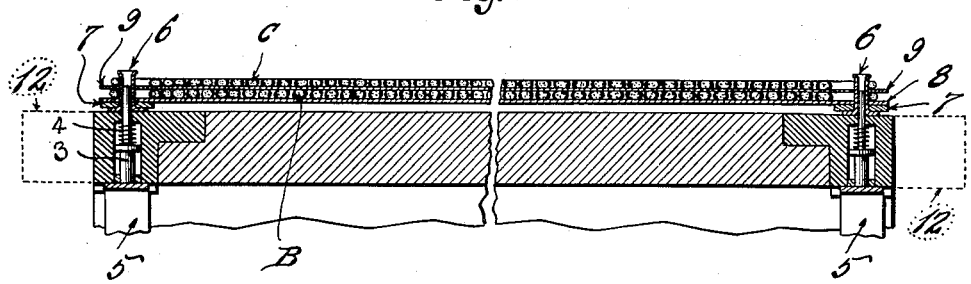
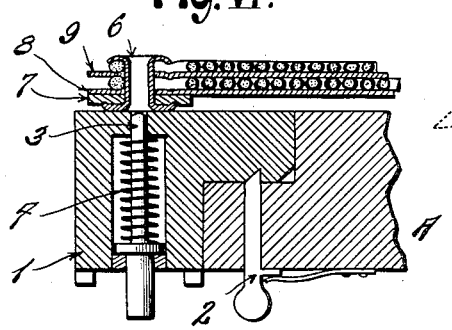
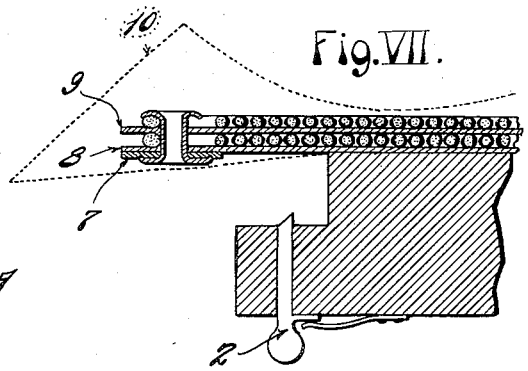
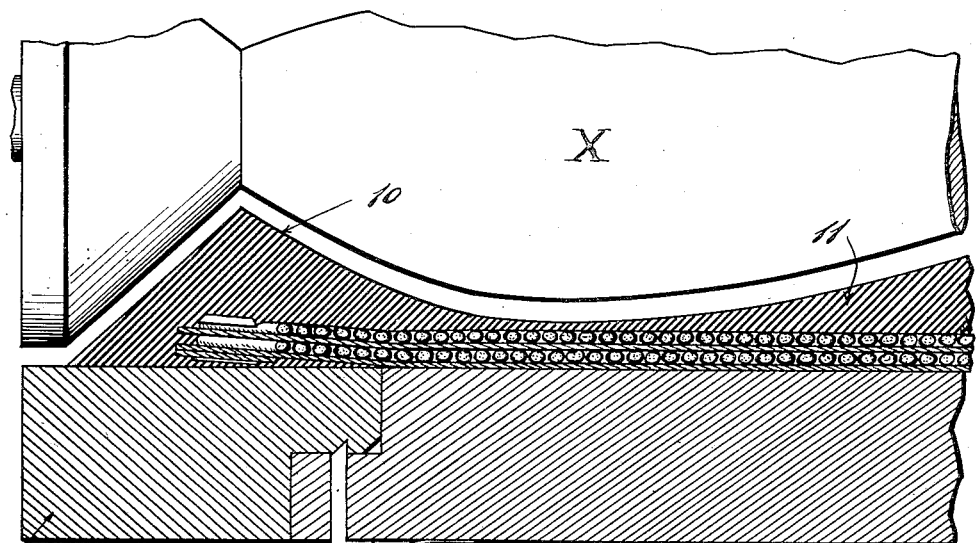

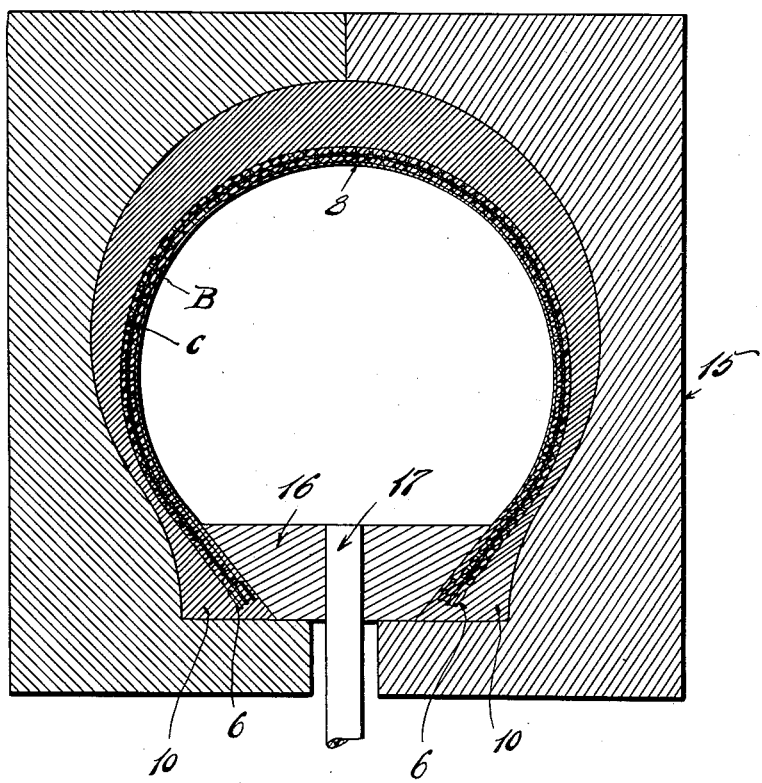
Fig. IX.

UNITED STATES PATENT OFFICE.

NELSON W. McLEOD, OF ST. LOUIS, MISSOURI, ASSIGNOR, BY MESNE ASSIGNMENTS, TO AMERICAN MOTORS TIRE COMPANY, OF DETROIT, MICHIGAN, A CORPORATION OF MICHIGAN.

ART OF MAKING CORD TIRES.

1,250,917.  Specification of Letters Patent.  Patented Dec. 18, 1917.

Application filed December 18, 1914. Serial No. 877,911.

*To all whom it may concern:*

Be it known that I, NELSON W. McLEOD, a citizen of the United States of America, a resident of the city of St. Louis, State of Missouri, have invented certain new and useful Improvements in the Art of Making Cord Tires, of which the following is a full, clear, and exact description, reference being had to the accompanying drawings, forming a part of this specification.

My invention relates to improvements in the art of making cord tires, one of the objects being to produce a tire by forming a narrow annular cord web, applying rubber to said web, shaping the annular web to the configuration of a hollow annular tire structure and finally vulcanizing the rubber. In carrying out the preferred form of my invention, the cord web is formed by winding cord onto a support to produce oppositely inclined cord elements and the structure so produced is preferably substantially flat in cross section. Thereafter, the web is covered with raw rubber and tire beads are formed at its margins. To produce a hollow tire of the desired shape, the marginal edges of the web are positioned adjacent to each other, and the middle portion of the web is extended, preferably by securing the marginal edges and introducing fluid under pressure into the fabric structure to expand it. The rubber is then vulcanized in any suitable manner while the web is expanded. The annular web, composed of oppositely inclined cords, is primarily approximately flat in cross-section, and the desired shape for the production of a tire is obtained by bringing the annular margins of the web toward each other and extending the middle portion of the web.

Another object of this invention is to produce a tire skeleton by winding cord onto an annular support to produce an annular web, removing the marginal portions to said annular support, and then forming tire beads at the free margins of the annular web. After the beads have been roughly formed at the free margins of the web I preferably place tire forming rings within said margins and apply rubber to the fabric structure, thereafter shaping the rubber while the web is arranged on the annular support.

A further object of this invention is to produce tire skeletons by securing cord holders to a series of supporting elements, winding cord onto said cord holders to produce a web, and thereafter withdrawing said series of supporting elements from the cord holders to release the web from said support. The cord holders just referred to are preferably tubular rivets and the support preferably includes a series of pins which extend into said tubular rivets. After the cord has been wound onto the tubular rivets the supporting pins are withdrawn and the rivets are upset to securely connect the cord elements to rings which lie at the margins of the cord structure.

Another object of this invention is to provide an improved method which comprises, winding cord partially around cord holding members arranged in annular rows, thereby producing an annular cord web, the margins of which are held by said annular rows of cord holding members, thereafter removing said annular rows of cord holding members to release the margins of said cord web, and then forming tire beads at the free margins of the web.

The invention also includes certain specific improvements in the art of making tires which will be hereinafter described.

Figure I is a side elevation of a support adapted to be used in carrying out my new method.

Fig. II is an enlarged fragmentary view illustrating oppositely inclined cord elements wound onto the periphery of the support shown in Fig. I.

Fig. III is a detail view illustrating a slight modification.

Fig. IV is a diagrammatical view of the cord winding shown in Fig. II.

Fig. V is an enlarged transverse section showing the cord web produced by winding cord onto the annular support shown in Fig. I.

Fig. VI is an enlarged fragmentary cross section, showing a marginal portion of the cord web as it appears when the cords are riveted to a connecting ring, and also showing one of the web holding rings detachably secured to the annular support.

Fig. VII is a view similar to Fig. VI, the cord web holding ring being removed.

Fig. VIII is an enlarged fragmentary cross-section, showing one of the tire forming rings attached to a margin of the annular support, and also showing a tire forming roller for shaping the tire structure on the annular support.

Fig. IX is a cross-section of a hollow vulcanizing mold with the tire arranged therein, the tire structure being inflated to engage the inner faces of the mold.

The apparatus I have shown to illustrate my new method comprises a rotatable annular support or mandrel A, and cord holding rings 1 detachably secured to the margins of said annular support. 2 designates yieldable latch members for securing the cord holding rings to the annular support. 3 designates cord holding pins slidably fitted to the cord holding rings 1 and adapted to project from the peripheries of said rings as shown in Figs. I, II and V. Springs 4 tend to move the cord holding pins to their inoperative position, shown in Fig. VI. Each cord holding ring 1 is provided with a circular row of the cord holding pins 3, and all of these pins may be retained in their operative positions by expansible rings 5, see Figs. I and V.

Before winding the cord onto the supporting elements, tubular rivets 6 are placed over the projecting portions of the cord holding pins 3, and these rivets are connected by means of rings 7 which may be made of vulcanized rubber or any other suitable material.

A sheet of raw rubber 8 is preferably placed over the outer ends of the rivets 6 and seated on the connecting rings 7. The inner fabric layer B is preferably formed by winding cord partially around the rivets 6 to produce a zig-zag winding consisting of cord elements each of which lies at an oblique angle to the side edges of the structure. A sheet of raw rubber 9 is preferably placed over the cord ply B and the outer cord ply C is then wound onto the rivets 6 so that its cord elements lie at an angle to the cord elements of the ply B.

Any suitable winding mechanism may be utilized in winding the cord onto the rivets and the completed fabric may include any desired number of plies of cord. Upon the completion of the winding operations the cord holding pins 3 are withdrawn from the rivets 6 and the outer ends of said rivets are upset to securely connect the ends of the cord elements to the connecting rings 7. The cord holding pins 3 may be readily withdrawn from the rivets 6 by removing or contracting the expansible rings 5, thus permitting the springs 4 to shift said pins 3 to their inoperative positions (shown in Fig. VI). It will be noted that each individual cord element may be firmly secured to the connecting rings 7 by the rivets 6, so that each cord element is a unit securely held at its ends, and although the different cord elements may be formed of a single cord, the different units are so secured that one or more of them may be ruptured without releasing any of the remaining cord units.

Fig. V shows that the web produced in carrying out my method may be substantially flat or straight in cross-section, and it will be apparent that a web of this kind may be readily formed by winding cord onto the rivets 6 which project from the periphery of the annular support.

After the rivets have been upset to secure the cord elements to the connecting members 7, the cord holding rings 1 are detached from the annular support A, and tire beads 10 are then roughly formed at the free side margins of the fabric, see Fig. VII. Raw rubber 11 is applied to the cord web, and tire forming rings 12 are secured to the margins of the annular support, as shown by dotted lines in Fig. V, and full lines Fig. VIII. These tire forming rings may be secured by the latch members 2 which also serve as means for attaching the cord holding rings to the annular support. The raw tire structure arranged on the annular support, is preferably shaped by means of a roller $x$ (Fig. VIII) and after this operation, it is removed from said support and placed in a suitable vulcanizing mold.

Since the annular web produced by winding the cord as herein described is approximately flat in cross-section, the method includes a step which preferably comprises, moving the margins of the web toward each other and extending the middle portion of the web to produce a hollow annular structure. In carrying out the preferred form of the invention, I remove the raw tire structure from the annular support, secure the margins of said structure in a vulcanizing mold 15, as shown in Fig. IX, wherein the said margins are securely clamped between an abutment ring 16 and a pair of mold sections. This positively fixes the position and shape of the tire beads, but the middle portion of the structure, which was primarily flat in cross-section, must be positively shaped to the desired configuration and this is preferably accomplished by introducing fluid under pressure into the raw structure, through a pipe 17, to force the outer face of the raw rubber into engagement with the inner face of the mold. The different elements may be so proportioned that the cords are stretched slightly during the operation of forcing the raw structure into engagement with the mold. The different cord elements are thus adjusted to the positions they occupy in service; and while the rubber is under pressure it is vulcanized in the mold 15.

I claim:—

1. The method of making a tire skeleton which comprises, winding cord onto an annular support to produce an annular web, separating the marginal portions of said annular web from said support, and then forming beads at the margins of said web before removal of said web from said support.

2. The method of making a tire, which comprises, winding cord onto an annular support to produce an annular web, separating the marginal portions of said annular web from said annular support, forming beads at the free margins of said web before removal of said web from said support, placing rubber over the web, removing the web from said support, shaping the web to the configuration of a tire and vulcanizing the rubber.

3. The method of making a tire, which comprises, winding cord onto an annular support to produce an annular web, separating the marginal portions of said annular web from said annular support, forming beads at the free margins of said web, before removal of said web from said support, placing bead forming material upon the margins of said web, rolling said bead forming material to produce beads, placing rubber over the web, shaping the rubber to the configuration of the web, then removing the web from said support, shaping the web to the configuration of a tire and vulcanizing the rubber.

4. The method of making a tire skeleton which comprises, winding cord onto rows of rivets arranged in connecting elements to produce a skeleton having cord elements which lie at an angle to the sides of said skeleton, and upsetting said rivets to secure them and the cord elements to the connecting elements.

5. The method of making a tire skeleton, which comprises, winding cord onto rows of cord holding members to produce a web, the margins of which are held by said rows of cord holding members, removing said rows of cord holding members to release the marginal portions of said web, and thereafter forming beads at the free margins of said web.

6. The method of making a tire skeleton, which comprises, winding cord onto annular rows of cord holding members to produce a fabricated structure, the margins of which are held by said annular rows of cord holding members, removing said cord holding members to release the marginal portions of said fabricated structure, and thereafter forming beads at the free margins of said fabricated structure.

NELSON W. McLEOD.

In the presence of:—
A. J. McCAULEY,
E. K. CLARK.